(12) United States Patent
Houston

(10) Patent No.: US 7,240,948 B1
(45) Date of Patent: Jul. 10, 2007

(54) CONVERTIBLE CARGO BED

(75) Inventor: Steven W. Houston, Evans, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 11/343,962

(22) Filed: Jan. 31, 2006

(51) Int. Cl.
*B60N 2/00* (2006.01)

(52) U.S. Cl. ...................................... 296/63
(58) Field of Classification Search ............... 296/63, 296/65.01, 64, 82.1, 83.1, 84.1
See application file for complete search history.

(56) References Cited

U.S. PATENT DOCUMENTS

| | | | |
|---|---|---|---|
| 4,573,225 A * | 3/1986 | Wolf | 296/69 |
| D292,899 S | 11/1987 | Samuelson et al. | |
| 5,697,662 A * | 12/1997 | Leftwich | 296/63 |
| 5,975,610 A * | 11/1999 | Tracy | 296/63 |
| 5,979,964 A * | 11/1999 | Ban et al. | 296/66 |
| D436,557 S | 1/2001 | Selby et al. | |
| 6,186,584 B1 * | 2/2001 | Samuelson et al. | 296/213 |
| D442,402 S | 5/2001 | Maypole | |
| D455,265 S | 4/2002 | Smith et al. | |
| 6,371,560 B1 | 4/2002 | Fulford et al. | |
| 6,378,748 B1 * | 4/2002 | Cox | 224/511 |
| 6,508,511 B1 * | 1/2003 | Kolpin | 297/256.16 |
| 6,550,838 B2 | 4/2003 | Bobbitt, III et al. | |
| 2005/0184559 A1 * | 8/2005 | Saito et al. | 296/190.08 |
| 2007/0013203 A1 * | 1/2007 | Ostroski et al. | 296/63 |

* cited by examiner

*Primary Examiner*—Kiran B. Patel
(74) *Attorney, Agent, or Firm*—Harness, Dickey & Pierce, P.L.C.

(57) ABSTRACT

A convertible cargo bed assembly for a utility vehicle is provided. The assembly includes a single piece molded main body having a pair of integrally formed hip restraints that each include a passenger hand hold integrally formed within the respective hip restraint. The assembly additionally includes a molded pivoting panel that has a cargo deck side and a seat side. The cargo deck side functions as a portion of a cargo deck when the pivoting panel is in a deployed position. The seat side has at least one full-sized seat cushion coupled thereto. That is the full-sized seat cushion is approximately the same size as the forward facing driver's and passenger's seats. Therefore, when the pivoting panel is transitioned from the deployed position to a stowed position, wherein the convertible cargo bed provides a full-sized rear facing seat.

9 Claims, 9 Drawing Sheets

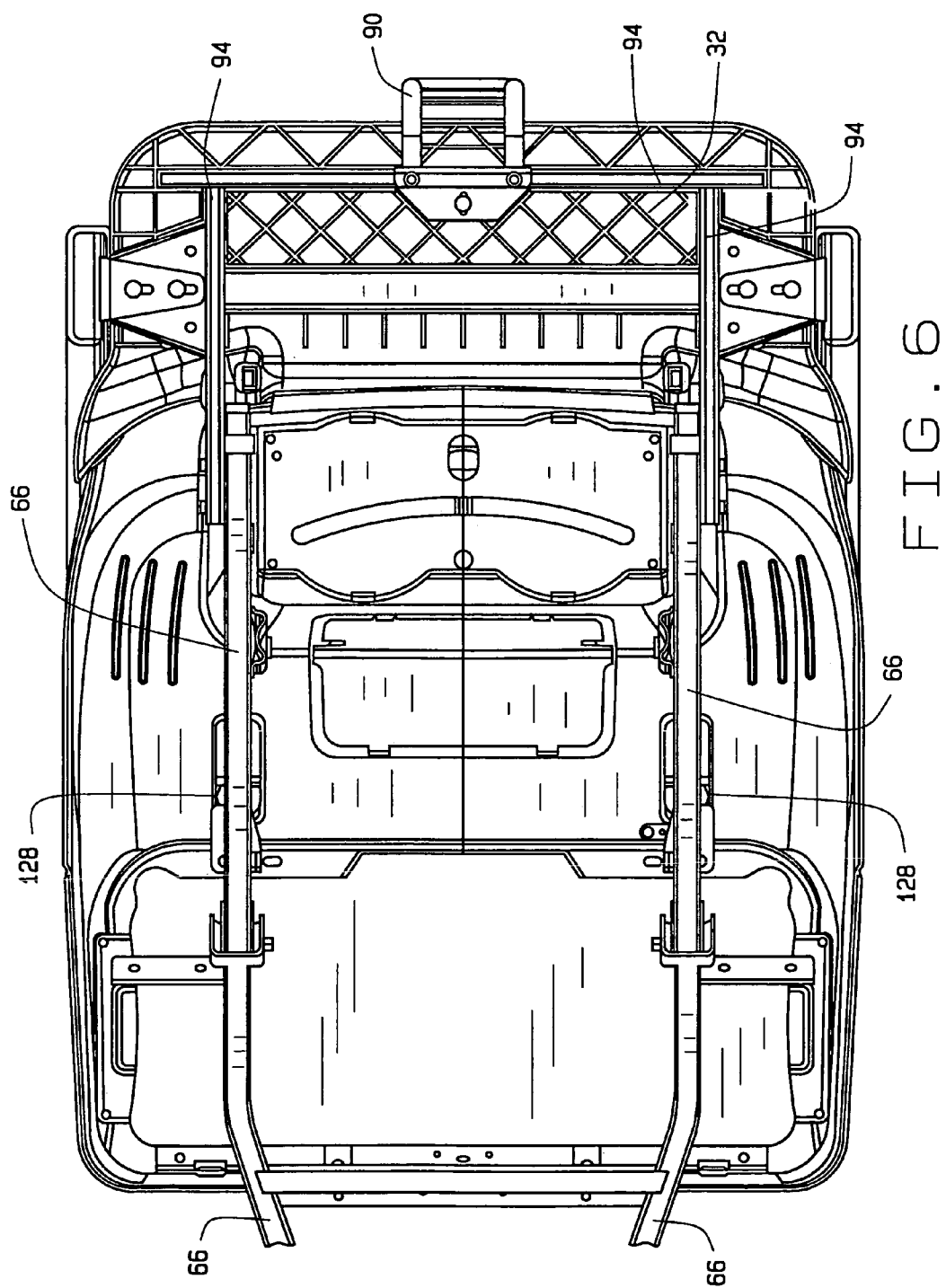

CONVERTIBLE CARGO BED

FIELD

The present disclosure relates to cargo beds for a utility vehicle and more particularly to a molded cargo bed that is convertible to a full-sized rear facing seat.

BACKGROUND

Typically, known utility vehicle cargo beds have a welded steel or welded aluminum construction and consist of many separate, mostly metal, components that are assembled using nuts and bolts.

Some known utility vehicle cargo beds are convertible to provide one or two compact-sized rear facing seats. Generally, a metal plate that forms a portion of the deck of the cargo bed is connected to the remaining portion of the deck by a fixed steel hinge, e.g. a piano hinge. To convert the cargo bed to a rear facing seat, the metal plate is pivoted along the fixed hinge and folded on top of the other portion of the deck. Such known convertible cargo beds only provide a reduced or compact-sized temporary seat compared to the full-sized forward facing seats, i.e. the driver's seat and the forward facing passenger's seat. Accordingly, the known convertible cargo beds are typically heavy, time consuming and costly to assemble, subject to rust, scratches and dents, noisy, create stability issues for the utility vehicle and only provide a compact-sized rear facing seat.

Therefore, it is desirable to provide a convertible cargo bed for utility vehicles that is light weight, has very few components, will not rust and will provide a full-sized rear facing seat when placed in the seat configuration.

SUMMARY

In various embodiments, a convertible cargo bed assembly for a utility vehicle is provided. The assembly includes a single piece molded main body having a pair of integrally formed hip restraints that each include a passenger hand hold integrally formed within the respective hip restraint. The assembly additionally includes a molded pivoting panel that has a cargo deck side and a seat side. The cargo deck side functions as a portion of a cargo deck when the pivoting panel is in a deployed position. The seat side has at least one full-sized seat cushion coupled thereto. That is, the full-sized seat cushion is approximately the same size as the forward facing driver and passenger's seats. Therefore, when the pivoting panel is transitioned from the deployed position to a stowed position, wherein the convertible cargo bed assembly provides a full-sized rear facing seat.

To place the convertible cargo deck in the rear facing seat configuration, the pivoting panel is pivoted about hinge posts of the panel as the hinge post are transitioned along the length of an elongated receptacles, formed in hip restraints, from a first end to a second end of the elongated receptacles. The panel is thereby rotatably transitioned from the deployed position to the stowed position, wherein the cargo deck side rests on a first deck portion of the main body such that a first portion of the pivoting panel is supported by the first deck portion. A second portion of the pivoting panel overhangs the first deck portion and is supported by hinge posts of the pivoting panel extending into the elongated receptacles.

To place the convertible cargo deck in the cargo deck configuration, the pivoting panel is pivoted about the hinge posts of the panel as the hinge posts are transitioned along the length of the elongated receptacles from the second end to the first end. The panel is thereby rotatably transitioned from the stowed position to the deployed position, wherein a top edge of the pivoting panel first portion is supported by a support bracket coupled to a grab rail connected to the frame of the utility vehicle. The pivoting panel second portion is supported by an edge of the pivoting panel second portion resting on a support ledge recessed along an edge of the first deck portion such that the cargo deck side of the pivoting panel is substantially coplanar with a surface of the first deck portion. Therefore, the pivoting panel functions as a second deck portion to form a substantially flat cargo deck.

The convertible cargo bed assembly further includes at least one seat back cushion that is adapted to be coupled to and removed from a back side of the main body. In various embodiments, the seat back cushion can be coupled to and removed from the back side without the use of tools, such as screw drivers, wrenches, pliers, powered hand tools, etc. In various other embodiments, the seat back cushion can be coupled to and removed from the back side using only a common hand tools such as a hex drive wrench or screw driver.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 6 is bottom view of the convertible cargo bed assembly shown in FIG. 1.

DETAILED DESCRIPTION

Figure 1:
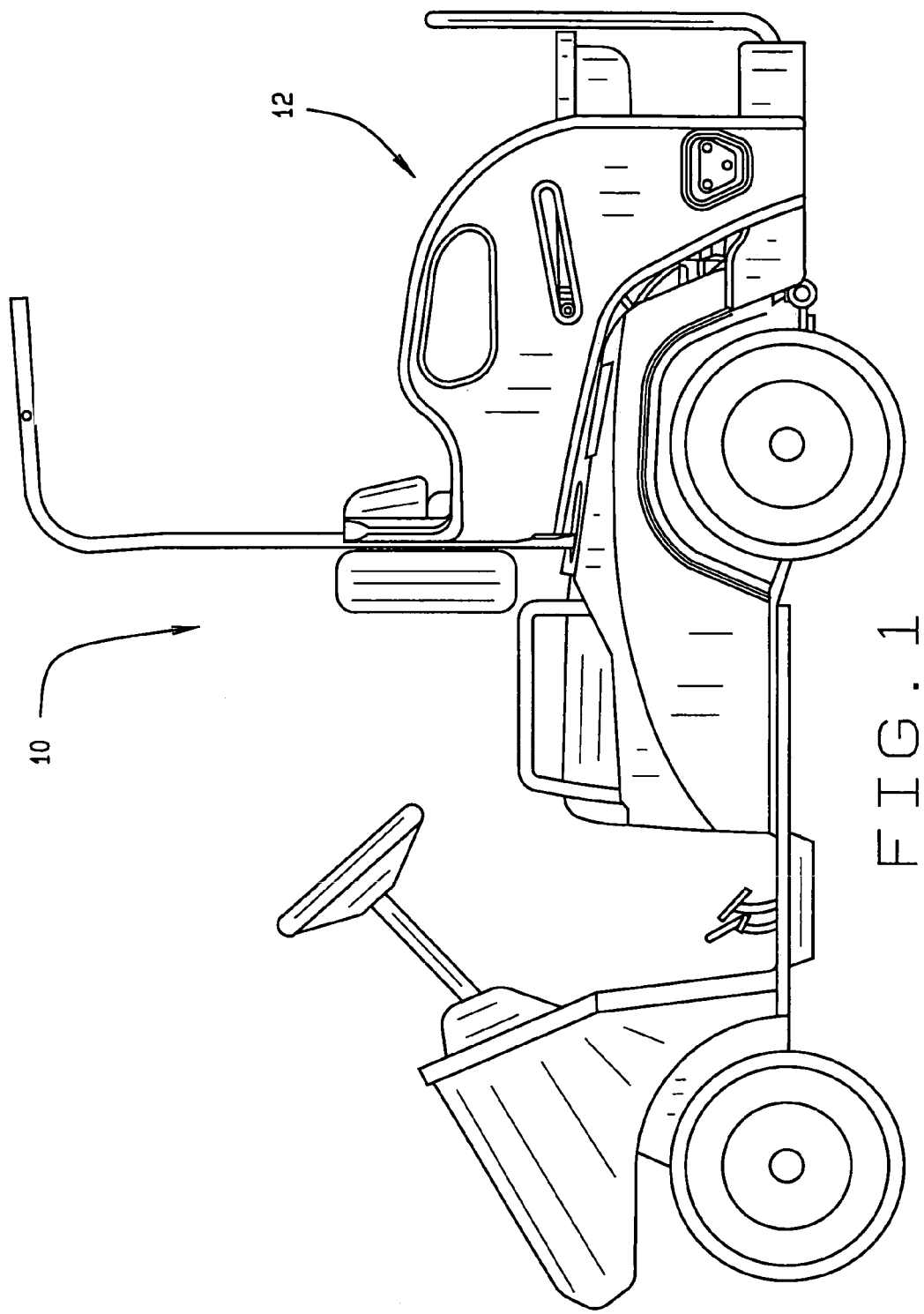
FIG. 1 is side view of a light-weight utility vehicle including a convertible cargo bed assembly, in accordance with various embodiments of the present disclosure.

The following description is merely exemplary in nature and is in no way intended to limit the present disclosure, application, or uses. Throughout this specification, like reference numerals will be used to refer to like elements.

FIG. 1 illustrates a light-weight utility vehicle 10 including a convertible cargo bed 12 assembly, in accordance with the various embodiment of the present disclosure. As described in detail below the convertible cargo bed 12 is convertible between a cargo deck configuration and a rear facing seat configuration that provides a full-sized rear facing seat.

Figure 1A:
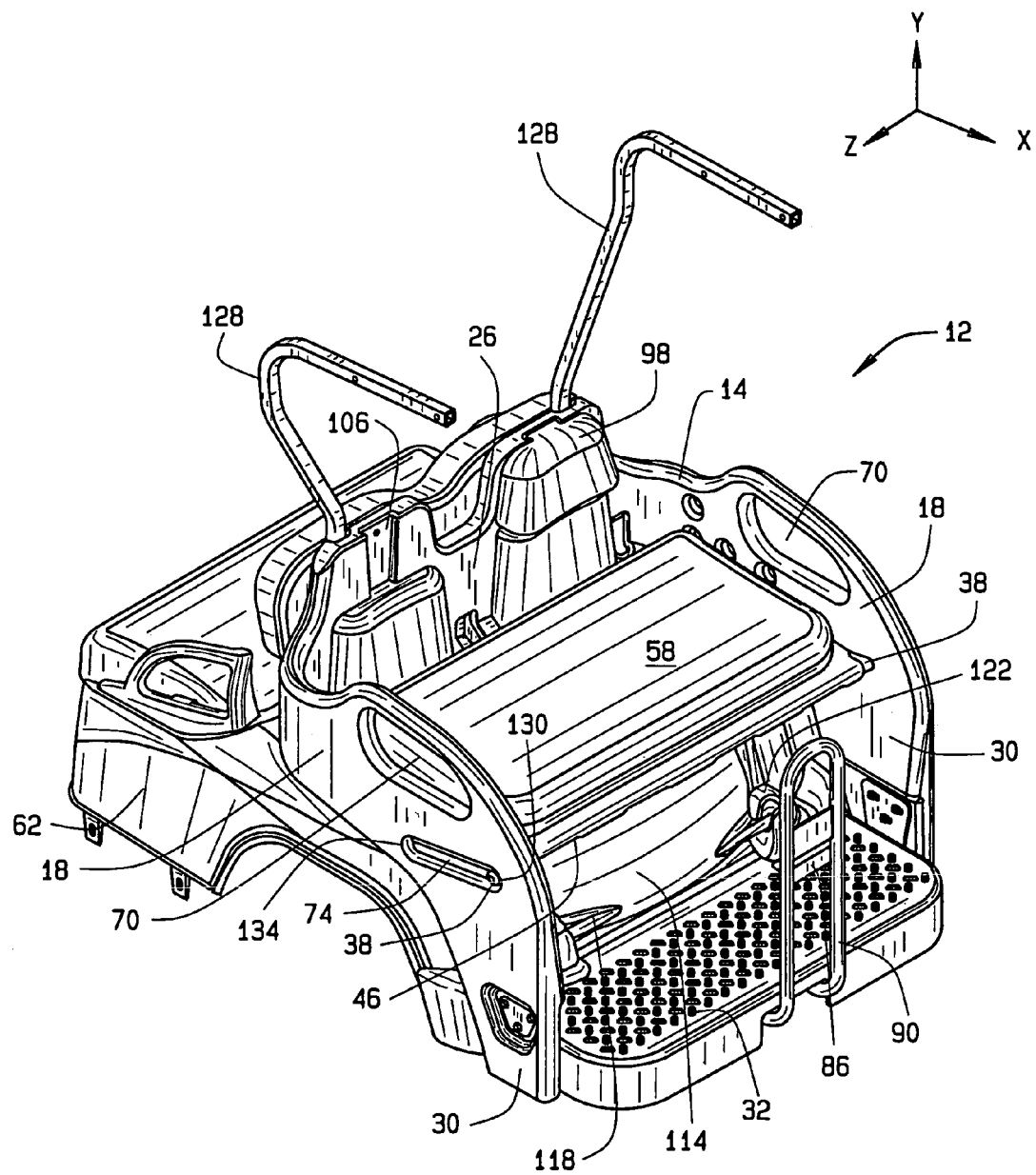
FIG. 1A is an isometric view of the convertible cargo bed assembly shown in FIG. 1 configured to provide a full-sized rear facing seat, in accordance with various embodiments of the present disclosure.
Figure 2:
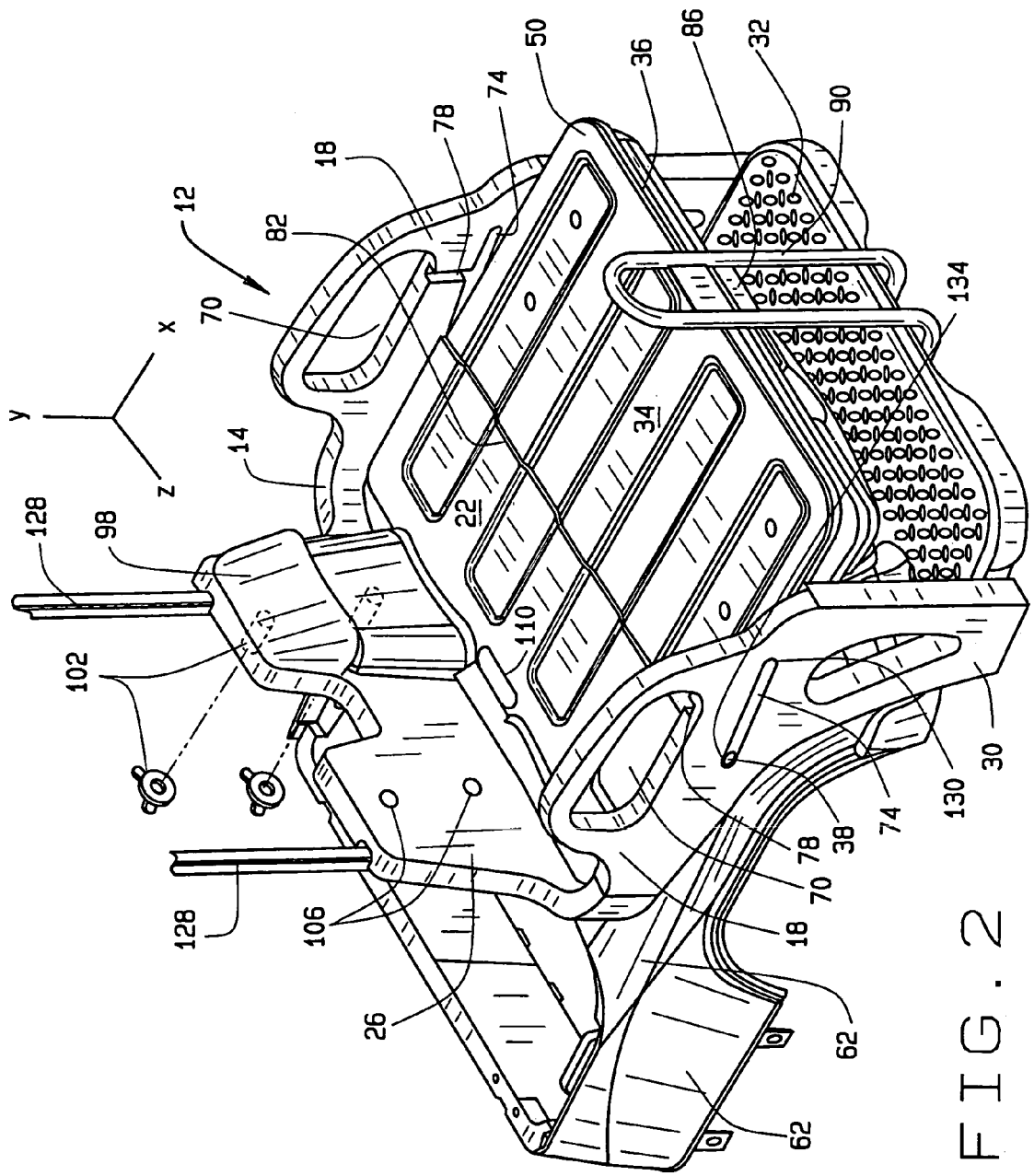
FIG. 2 is an isometric view of the convertible cargo bed assembly configured to provide a cargo deck, in accordance with various embodiments of the present disclosure.

Referring to FIGS. 1A and 2, a convertible cargo bed assembly 12 for a utility vehicle is illustrated. The convertible cargo bed assembly 12 includes a one-piece main body 14 having a pair of opposing sidewalls 18 and a first deck portion 22, all of which are integrally formed within the main body 14. The sidewalls 18 extend substantially perpendicularly from the first deck portion 22 and are substantially planarly parallel. That is, the plane of each of the opposing sidewalls 18 is substantially 3-dimensionally parallel, i.e., substantially parallel with respect to each of an X, Y, and Z axis. The main body 14 additionally includes an integrally formed back side 26 that extends between the sidewalls 18 and substantially perpendicularly from the first deck portion 22. The main body 14 further includes a pair of integrally formed opposing legs 30 that extend downward from each of the sidewalls 18.

Figure 3A:
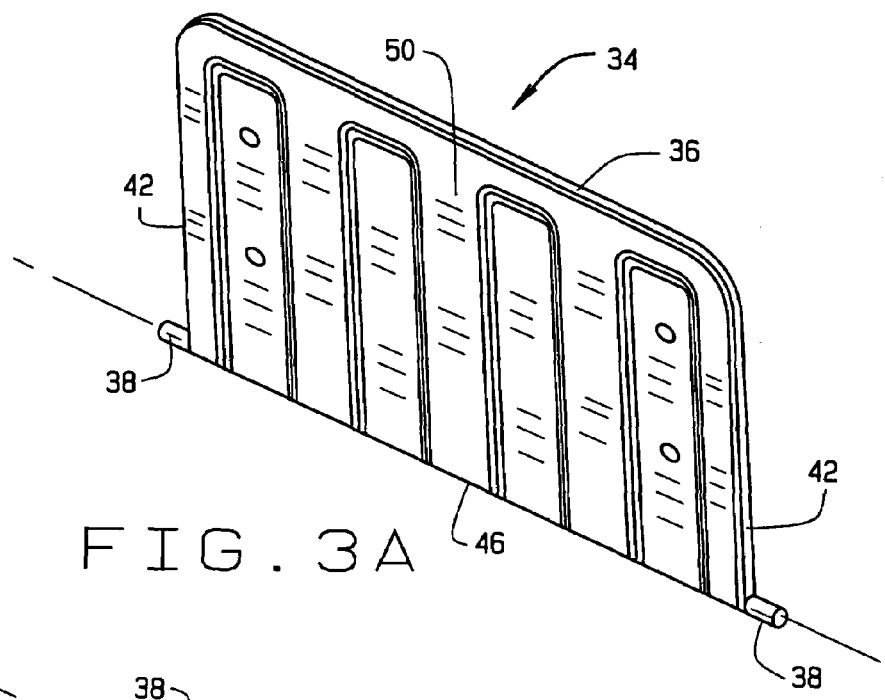
FIG. 3A is an isometric illustration of a deck side of a pivoting panel included in the cargo bed assembly, shown in FIGS. 1 and 2.
Figure 3B:
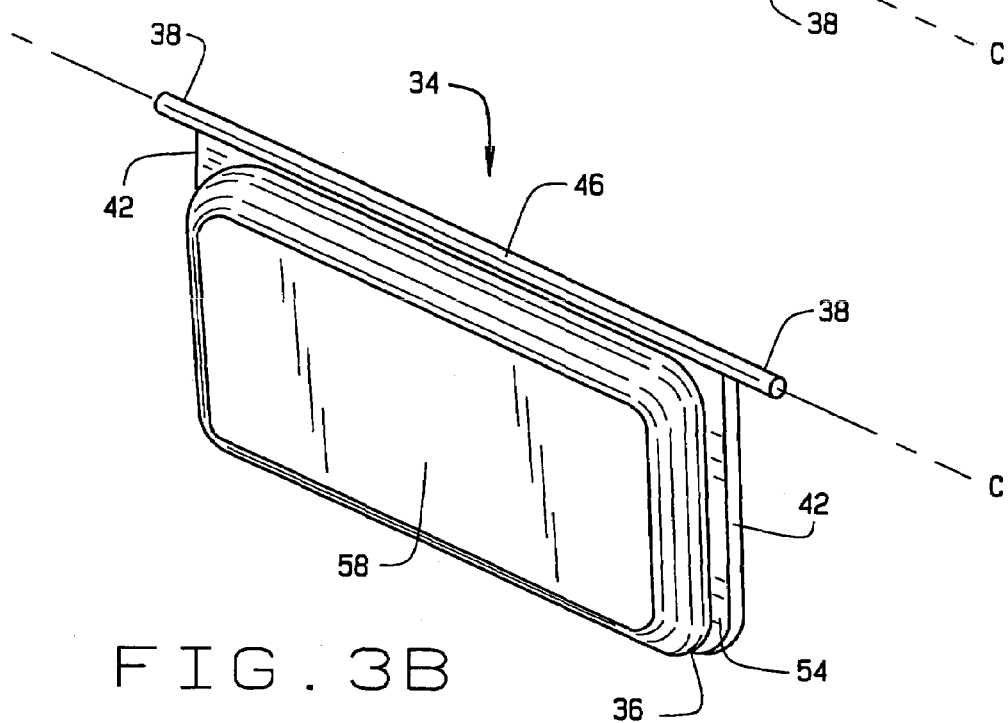
FIG. 3B is an isometric illustration of a seat side of the pivoting panel shown in FIG. 3A.

Referring now to FIGS. 1A, 2, 3A and 3B, the convertible cargo bed assembly 12 still further includes a pivoting panel 34 and a foot rest 32. The foot rest 32 is positioned between opposing ends to the legs 30 of the main body 14 and can be coupled to a metal undercarriage structure 94, shown in FIG. 6. As best illustrated in FIGS. 3A and 3B, the pivoting panel 34 includes a top edge 36 and a pair of opposing hinge posts, or hinge studs, 38 extending from opposing ends 42 adjacent a bottom edge 46. The posts 38 can be either integrally formed with the pivoting panel 34 or coupled to the ends 42 utilizing any suitable coupling means, for example bolted, screwed or riveted to the ends 42. The pivoting panel 34 additionally includes a cargo deck side 50 adapted to provide a portion of a cargo deck when the cargo bed assembly 12 is placed in a cargo deck configuration with the pivoting panel 34 in a deployed position, as shown in FIG. 2.

The pivoting panel further includes a seat side 54 adapted to have at least one full-sized seat cushion 58 attached thereto to provide at least one full-sized rear facing seat when the cargo bed assembly 12 is placed in a rear facing seat configuration with the pivoting panel 34 in a stowed position, as shown in FIG. 1A. As used herein in some embodiments, full-sized seat cushion and full-sized rear facing seat mean a seat cushion and seat that are substantially equal in size as the forward facing driver and passenger seats of the utility vehicle. For example, the full-sized seat cushion 58 can be approximately 40 inches wide, 20 inches long and 4 inches thick. Although the seat cushion 58 is illustrated throughout the various figures as a single cushion, the seat cushion 58 can be two or more individual seat cushions that cumulatively provide at least one full-sized rear facing seat.

The convertible cargo bed assembly 12 covers a portion of a utility vehicle body structure 62 and attaches to a metal frame 66, shown and described below in reference to FIG. 6, of a utility vehicle (not shown). In various embodiments the sidewalls 18 function as hip restraints for preventing a passenger from sliding off the side of the seat cushions 58 and will alternately be referred to herein as hip restraints 18. In various implementations the main body 14, the pivoting panel 34, and the foot rest 32 are each single molded structures constructed of any suitable plastic or composite, such as linear high density polyethylene or glass filled polypropylene.

Figure 4:
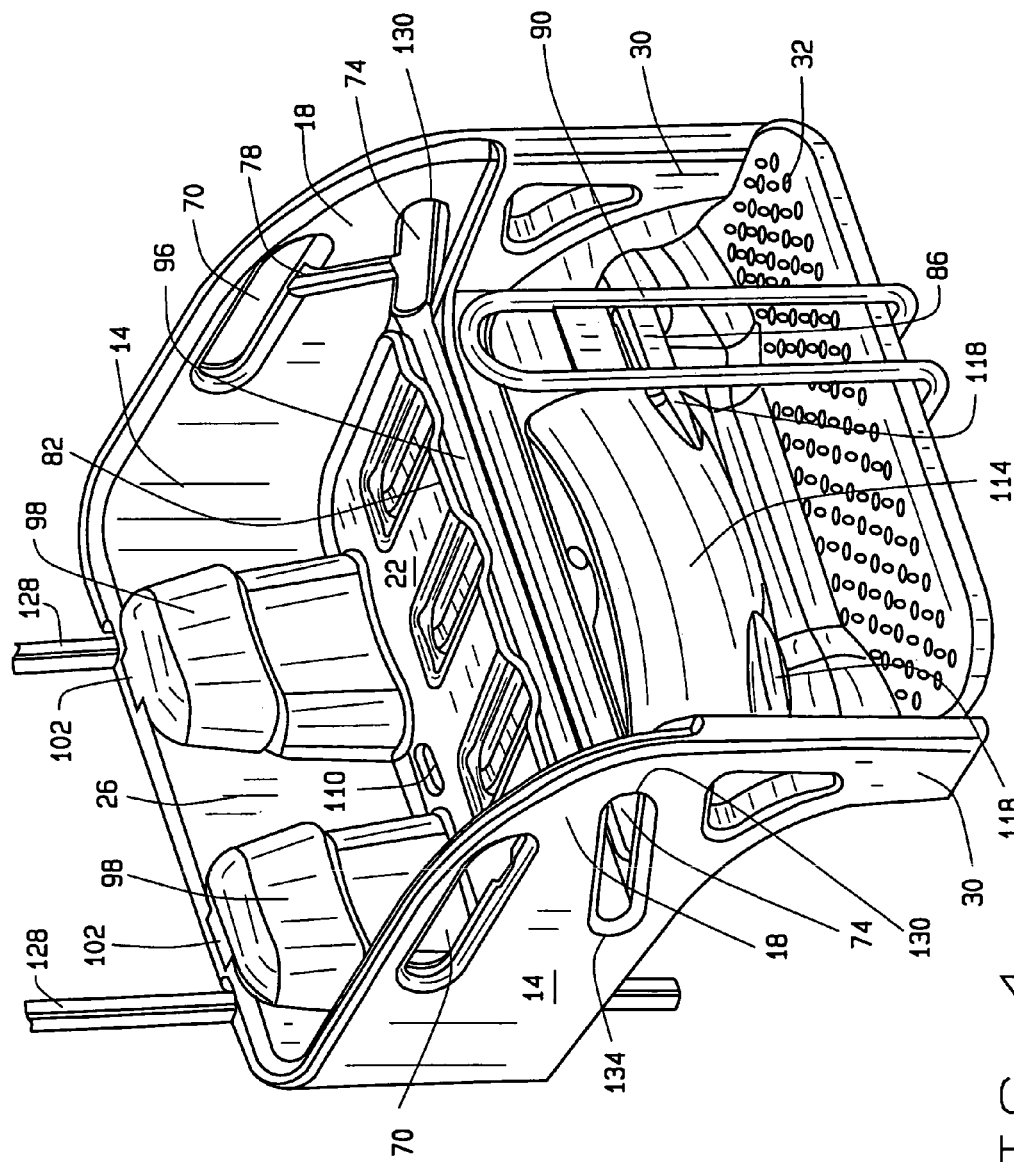
FIG. 4 is an isometric illustration of the convertible cargo bed assembly shown in FIG. 1 having the pivoting panel shown in FIG. 3 removed, in accordance with various embodiments.

Referring now to FIGS. 2 and 4, in various embodiments, each hip restraint/sidewall 18 includes an insertion receptacle 70 that can be an aperture through or a recess in the respective sidewall 18. Each of the sidewalls 18 additionally include an elongated receptacle 74 and a transfer channel 78 extending between each insertion receptacle 70 and elongated receptacle 74. The transfer channels 78 are substantially linearly parallel within the substantially planarly parallel sidewalls 18. Similar to the insertion receptacles 70, the elongated receptacles 74 and transfer channels 78 can be apertures through or recesses in the sidewalls 18. The elongated receptacles 74 are adapted to retain the posts 38 of the pivoting panel 34, as illustrated in FIGS. 1A and 2. To retain the posts 38 within the elongated receptacles 74, the pivoting panel is placed in a canted, or diagonal, orientation between the sidewalls 18. That is, the pivoting panel 34 is oriented between the sidewalls 18 such that one of the posts 38 is positioned within one of the insertion receptacles 70 at an end of the insertion receptacle 70 closest the back side 26 of the main body 14, while the opposing post 38 is positioned within the opposing insertion receptacle 70 at an end of the insertion receptacle 70 furthest away from the back side 26.

The pivoting panel 34 is then brought to an orientation wherein the pivoting panel 34 is substantially perpendicular with each sidewall 18, i.e., having a substantially geometrically square relation to the sidewalls 18, such that each post 38 is aligned with the transfer channel 78 of the respective sidewall 18. The pivoting panel 34 is then moved downward to transition the posts 38 through the respective transfer channels 78 into the respective elongated receptacles 74. In various implementations, the insertion receptacles 70 also provide hand holds for passengers seated on the rear facing seat when the cargo bed assembly 12 is placed in a rear facing seat configuration.

Figure 2A:
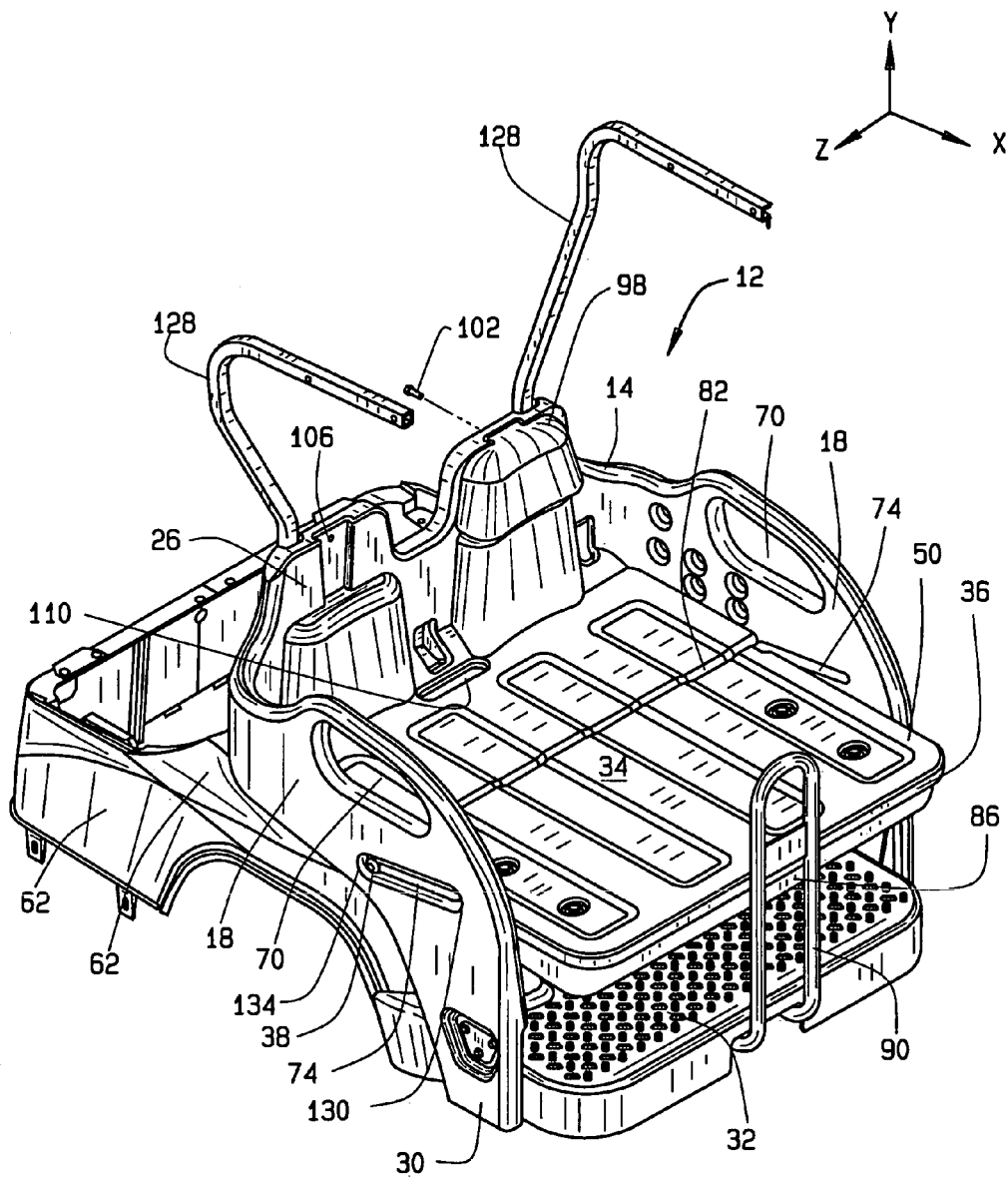
FIG. 2A is an isometric view of the convertible cargo bed assembly configured to provide a cargo deck, in accordance with various other embodiments of the present disclosure.
Figure 4A:
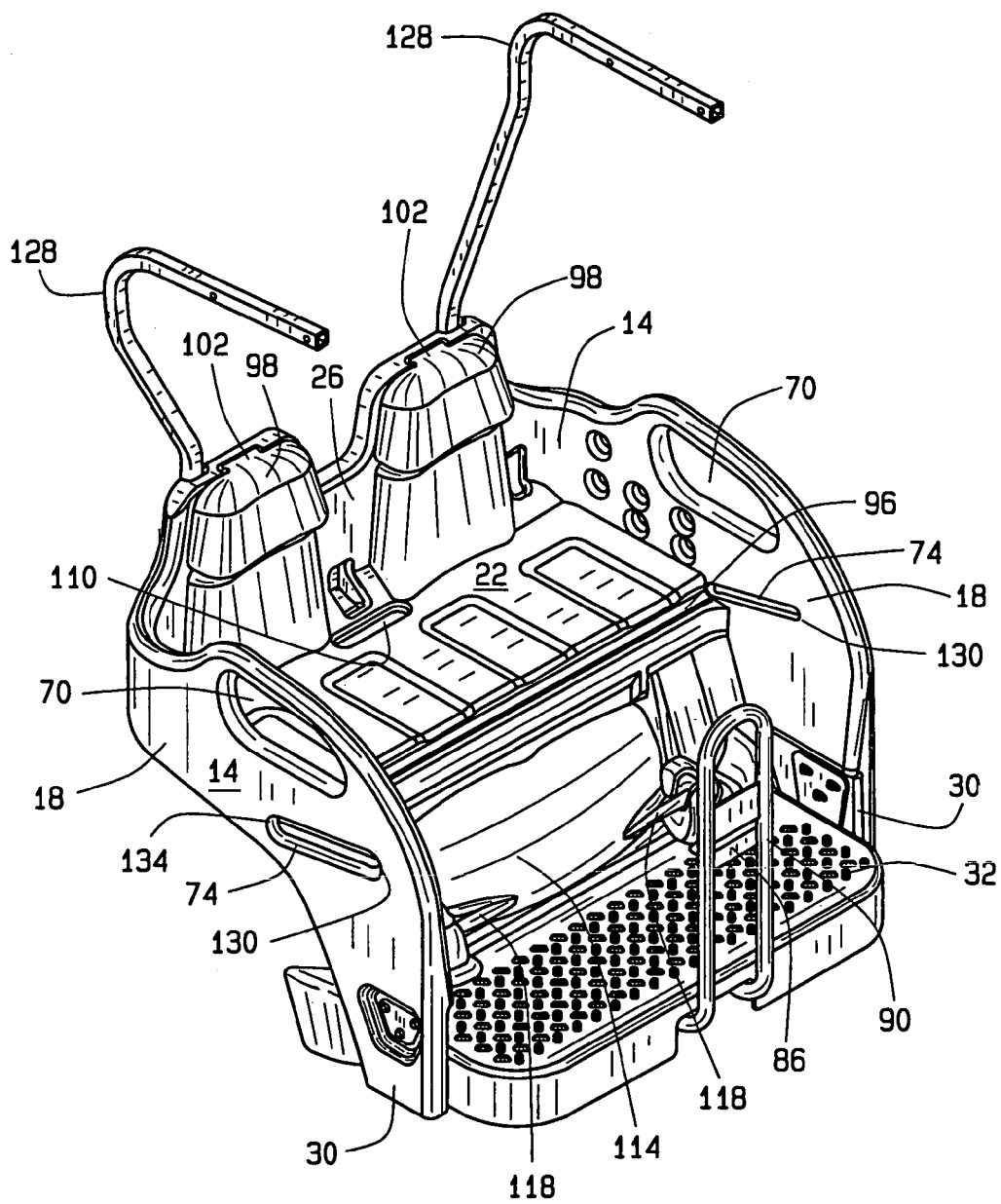
FIG. 4A is an isometric illustration of the convertible cargo bed assembly shown in FIG. 4, in accordance with various other embodiments.

Referring now to FIGS. 2A and 4A, in various other embodiments, each hip restraint/sidewall 18 includes only the hand holds 70 and the elongated receptacle 74. To retain the posts 38 within the elongated receptacles 74, the pivoting panel is placed in a canted, or diagonal, orientation between the sidewalls 18. At least one of the sidewalls 18 is manually flexed so that the pivoting panel 34 is oriented between the sidewalls 18 having one of the posts 38 positioned within one of the elongated receptacle 74 at a first end 130 furthest away from the back side 26, and the opposing post 38 positioned within the opposing elongated receptacle 74 at a second end 134 closest to the back side 26. The pivoting panel 34 is then brought to a substantially square orientation between the sidewalls 18.

Once the hinge posts 38 are retained within the elongated receptacles 74, the pivoting panel 34 can be transitionally pivoted from the deployed position to the stowed position, as described further below, wherein the cargo deck side 50 rests on a first deck portion 22 of the main body 14. A first portion of the pivoting panel 34 is supported by the first deck portion 22 and a second portion of the pivoting panel 34 extends past an edge 82, overhanging the first deck portion 22, as best illustrated in FIG. 1A. The second portion of the pivoting panel 34 is supported by the hinge posts 38 of the pivoting panel 34 extending into elongated receptacles 74 formed in the sidewalls 18. By extending the second portion of the pivoting panel 34 past the first deck portion edge 82, the pivoting panel 34 can have dimensions suitable to accommodate and support the full-sized seat cushion 58.

Figure 5:
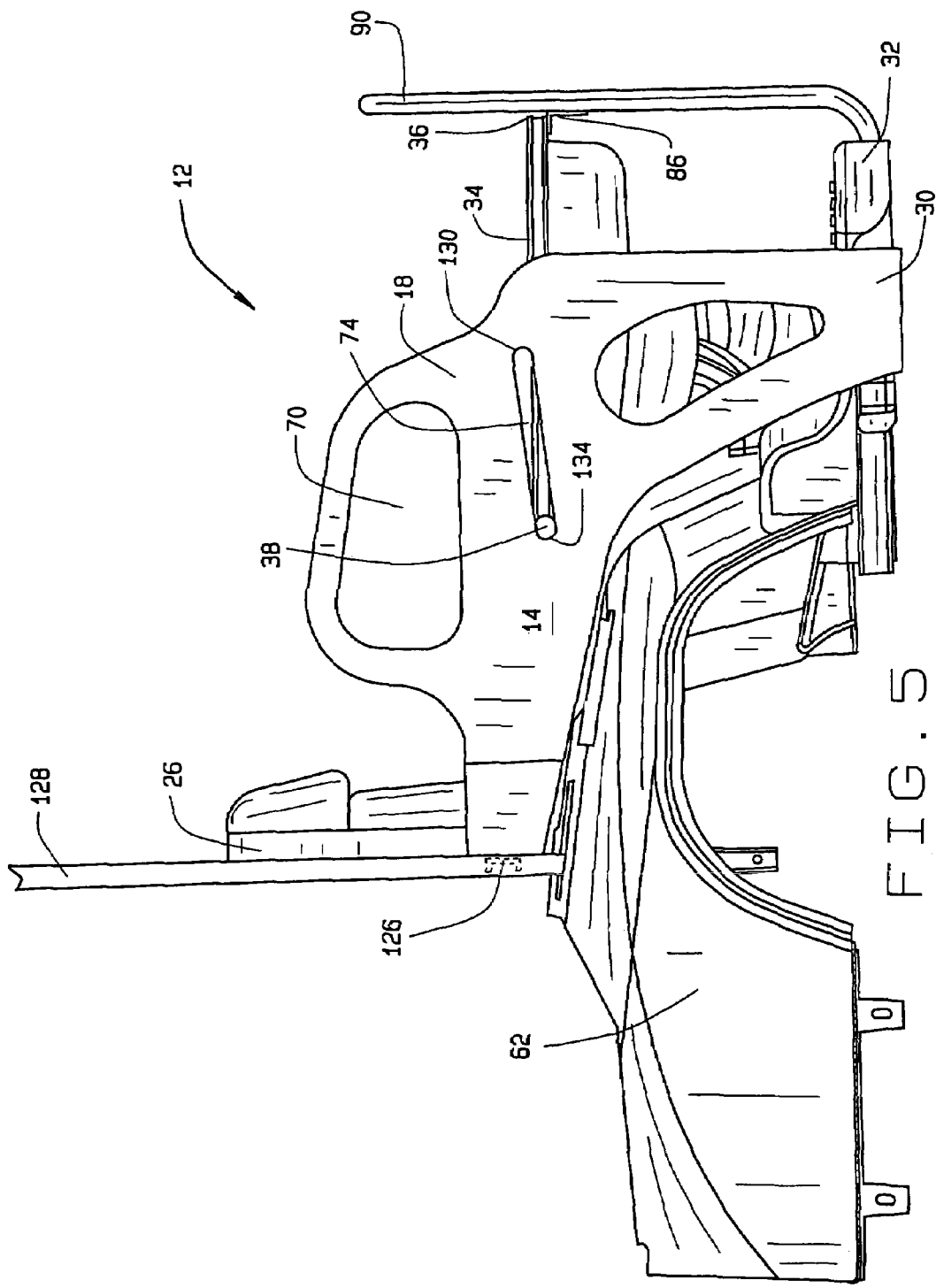
FIG. 5 is a side view of the convertible cargo bed assembly configured to provide the cargo deck as shown in FIG. 2.

Referring now also to FIGS. 5 and 6, the pivoting panel 34 can be transitionally pivoted from the stowed position to the deployed position, as described further below, wherein the top edge 36 of the pivoting panel first portion is supported by a support bracket 86 coupled to a grab rail 90. The grab rail 90 extends upward from a back edge of the foot rest 32 and is coupled to the metal undercarriage structure 94 that is coupled to the frame 66. The grab rail 90 is utilized as a handle to provide stability to passengers stepping on the foot rest 32 to embark and disembark the rear facing seat when the cargo bed assembly 12 is in the stowed configuration. In the deployed position, the pivoting panel second deck portion is supported by the pivoting panel bottom edge 46 resting on a support ledge 96, best shown in FIG. 4, recessed along the edge 82 of the first deck portion 22. More specifically, the bottom edge 46 mates with the recessed support ledge 96 such that the cargo deck side 50 of the pivoting panel 34 is substantially coplanar with the surface of the first deck portion 22. Accordingly, when in the deployed position, the pivoting panel 34 serves as a second deck portion to adjoin the first deck portion to form a substantially flat cargo deck. The recessed support ledge 96 can have any suitable shape to mate with the pivoting panel bottom edge 46, e.g. curved with a radius or a 90° square cut out.

Referring now to FIGS. 1A, 2, and 4, the cargo bed assembly 12 includes at least one seat back cushion 98 including a first connector 102. Additionally, the main body back side 26 includes a second connector 106 adapted to mate with the first connector 102 such that the seat back cushion(s) 98 can be coupled to and removed from the back side 26 by hand. In various embodiments, the seat back cushion(s) 98 can be coupled to and removed from the back side 26 without the use of tools, such as wrenches, screw drivers, pliers or powered hand tools. In various other embodiments, the seat back cushion(s) 98 can be coupled to and removed from the back side 26 using only a common hand tools such as a hex drive wrench or screw driver.

In some embodiments, as shown in FIG. 1A, the first connector 102 comprises a first portion of a dove-tail connection and the second connector 106 comprises a mating second portion of the dove-tail connection. Thus, the seat back cushion(s) 98 can be coupled to and removed from the back side 26 by sliding the first portion of the dove-tail connection into or out of the second portion. In various embodiments, as shown in FIG. 2, the second connector 106 comprises at least one hole through the back side 26 and the first connector comprises a threaded post (shown in phantom), extending from a back side of the seat cushion 98, and a mating thumb-nut. Thus, the seat back cushion(s) 98 can be coupled to and removed from the back side 26 by inserting the threaded post through the hole(s) in the back side 26 and threading or unthreading the thumb-nut onto or off of the threaded post. In other implementations, as shown in FIG. 2A, the second connector 106 comprises at least one hole through the back side 26 and the first connector comprises a female cinch nut molded into the seat back cushion 98 and a mating threaded bolt. Thus, the seat back cushion(s) 98 can be coupled to and removed from the back side 26 by inserting the threaded bolt through the hole(s) in the back side 26 and threading or unthreading the bolt into or out of the cinch nut. In other various embodiments, the seat back cushion(s) 98 can be coupled to the back side 26 using any suitable connecting means that allow the seat back cushions 98 to be easily and quickly attached to and removed from the back side 26. For example, the seat back cushion(s) 98 can be coupled to the back side 26 using snaps, buttons, compression plugs, etc.

In various embodiments, the cargo bed assembly 12 includes a refuse aperture 110 in the first deck portion 22. The refuse aperture 110 allows water or debris that may accumulate on the first deck portion 22 to drain off of or be removed from the first deck portion 22. Additionally, the refuse aperture 110 provides an access opening that allows a person to easily grab the pivoting panel top edge 36 to pivot the pivoting panel 34 about the hinge posts 38 and simultaneously transition the hinge posts 38 along the elongated receptacle 74 to move the pivoting panel 34 from the stowed position to the deployed position. In various embodiments, the cargo bed assembly 12 includes a storage compartment door 114, best shown in FIGS. 1A and 4, that includes a pair of bosses 118. The bosses 118 snap fit into and are rotatable within a pair of recesses 122 integrally formed in the foot rest portion 32. The storage compartment door 114 provides access to a storage area under the main body 14. Preferably, the bosses 118 include raised nodules or ridges (not shown). Additionally, the recesses 122 include complementary raised nodules or ridges that provide frictional interference with the raised nodules/ridges on the bosses 118 such that the bosses 118 snap into the recesses 122. The raised nodules/ridges are located on both the bosses 118 and the recesses 122 such that they limit the opening travel of the storage compartment door 114 and also retain the storage compartment door 114 in a closed position. In some embodiments, the storage compartment door is a single molded structure.

In some embodiments, the main body 14 attaches to the utility vehicle at three attachment points. More particularly, the foot rest 32 is coupled to the metal undercarriage structure 94, as shown in FIG. 6, between the bottom of each leg 30 which are also coupled to the metal undercarriage structure 94. The back side 26 of the main body 14 couples to a cross member 126, shown in phantom in FIG. 5, that is coupled to each of a pair of substantially vertical struts 128. The struts 128 are coupled to the frame 66 of the utility vehicle, as illustrated in FIG. 6. The struts 128 can also support structures, such as a canopy over the convertible cargo bed assembly 12 and/or a front passenger area of the utility vehicle.

In some embodiments, the cross member 126 is a metal structure, such as a piece of angle iron or C-channel, and the main body 14 includes a support ledge (not shown) that rests on top of the cross member 126. The main body is coupled to the cross member 126 by bolting the back side 26 to the cross member 126. Therefore, support is provided across a large portion of back side 26, or substantially the entire back side 26.

Referring now to FIGS. 2 and 4, in various embodiments, the pivoting panel 34, the insertion receptacles/hand holds 70, the transfer channels 78 and the elongated receptacles 74 combine to provide a transitionally pivoting panel assembly. To retain the hinge posts 38 within the elongated receptacles 74, the pivoting panel 34 is canted between the sidewalls 18, the hinge posts 38 are inserted into the insertion receptacles 70 and transitioned through the transfer channels 78 into the elongated receptacles 74. The insertion receptacles 70 have a height and width suitable to allow the hinge posts 38 to be inserted when the panel is canted. The elongated receptacles 74 are sized to retain the hinge posts 38 such that the hinge posts 38 can not be removed from the elongated receptacles 74 without transitioning the hinge posts 38 though the transfer channels 78 into the insertion receptacles 70. Additionally, the elongated receptacles 74 are sized to allow each hinge post 38 to be rotated and simultaneously slidably transitioned between a first end 130 and a second end 134 of each respective elongated receptacle 74.

Referring to FIGS. 2A and 4A, in various other embodiments, the transitionally pivoting panel assembly comprises the pivoting panel 34 and only the elongated receptacles 74. To retain the hinge posts 38 within the elongated receptacles 74, the pivoting panel 34 is canted between the sidewalls 18, at least one sidewall 26 is flexed to allow the hinge posts 38 to be inserted into the opposing ends 130 and 134 of the elongated receptacles 74 and the pivoting panel 34 is transitioned to a square orientation between the sidewalls 18. The elongated receptacles 74 are sized to retain the hinge posts 38 such that the hinge posts 38 can not be easily removed from the elongated receptacles 74 without significantly deflecting at least one sidewall 18 while the pivoting panel 34 is canted. The elongated receptacles 74 are also sized to allow each hinge post 38 to be rotated and simultaneously slidably transitioned between a first end 130 and a second end 134 of each respective elongated receptacle 74.

The transitionally pivoting panel assembly is adapted to place the pivoting panel 34 in the stowed position to provide a full-sized rear facing seat or in the deployed position where the deck side 50 mates with the first deck portion 22 to provide a substantially flat cargo deck surface.

Referring now to FIG. 5, the elongated receptacles 74 are furthermore formed within each respective sidewall 18 such that each elongated receptacle 74 is angled to decline from the first end 130 to the second end 134. The angled elongated receptacles 74 allow the pivoting panel bottom edge 46 to mate with the recessed support ledge 96 of the first deck portion 82 when in the deployed position, so that the surface of the pivoting panel deck side 50 is substantially coplanar with the surface of the first deck portion 22. Additionally, when in the stowed position, the angled elongated receptacles 74 allow the bottom edge 46 to be slightly elevated from when the pivoting panel is in the deployed position so that the first portion of deck side 50 rests substantially flat on the first deck portion 22. That is, the surface of the first deck portion 22 is substantially planarly parallel and solidly in contact with the surface of the pivoting panel deck side 50.

The pivoting panel 34 is rotationally transitioned between the stowed position and the deployed position by sliding the pivoting panel hinge posts 38 between the first ends 130 and the second ends 134 of the elongated receptacles 74 while simultaneously rotating the pivoting panel 34 about a centerline C of the hinge posts 38, shown in FIGS. 3A and 3B. More specifically, when the pivoting panel 34 is in the stowed position, the hinge posts 38 are located at the first ends 130 of the elongated receptacles 74 and the first portion of the pivoting panel 34 rests on top of the first deck portion 22. To rotationally transition the pivoting panel 34 from the stowed position to the deployed position, the panel top edge 36 is lifted such that the pivoting panel 34 begins to rotate about the center line C of the hinge posts 38. The hinge posts are then slid along the elongated receptacles 74 from first ends 130 of the elongated receptacles 74 to the second ends 134 of the elongated receptacles 74. Simultaneously, the pivoting panel 34 is further rotated about the centerline C to thereby flip the pivoting panel 34 over such that the pivoting panel 34 is in the deployed position. Accordingly, the bottom edge 46 of the pivoting panel 34 mates with an edge of the first deck portion 22 and the pivoting panel 34 extends from the first deck portion 22 to form a substantially flat deck.

Similarly, to rotationally transition the pivoting panel 34 from the deployed position to the stowed position, the panel top edge 36 is lifted such that the pivoting panel 34 begins to rotate about the center line C of the hinge posts 38. The hinge posts are then slid along the elongated receptacles 74 from second ends 134 to the first ends 130 of the elongated receptacles 74. Simultaneously, the pivoting panel 34 is further rotated about the centerline C to thereby flip the pivoting panel 34 over such that the first portion of the pivoting panel 34 rests on the first deck portion 22, thereby placing the pivoting panel 34 in the stowed position.

In some embodiments, the elongated receptacles 74 are sized to allow the hinge posts 38 to be rotated and simultaneously slidably transitioned between the first ends 130 to the second ends 134 of the elongated receptacles 74 and also allow the hinge posts 38 to be inserted and removed from the elongated receptacles 74 by canting the pivoting panel 34 in the same manner described above with reference to inserting the hinge posts 38 into the insertions receptacles 70.

Although the pivoting panel assembly has been described herein with respect to a convertible cargo bed assembly for a utility vehicle, it should be understood that the pivoting panel assembly can be employed in various other applications and remain within the scope of the disclosure. For example, the pivoting panel assembly could be utilized to rotationally transition a truck tailgate between a stowed position and deployed position, or rotationally transition a storage box door between a towed position and deployed position.

The section headings used herein are for organizational purposes only and are not to be construed as limiting the subject matter described in any way. Additionally, the description herein is merely exemplary in nature and, thus, variations that do not depart from the gist of that which is described are intended to be within the scope of the disclosure. Such variations are not to be regarded as a departure from the spirit and scope of the disclosure. Therefore, while the present teachings are described in conjunction with various embodiments, it is not intended that the present teachings be limited to such embodiments. On the contrary, the present teachings encompass various alternatives, modifications, and equivalents, as will be appreciated by those of skill in the art.

What is claimed is:

1. A rear facing seat assembly for a utility vehicle, said assembly comprising:
   a main body including a pair of integrally formed hip restraints that each include an integrally formed elongated receptacle; and
   a pivoting panel including a pair of hinge posts extending into the elongated receptacles, a cargo deck side adapted to provide a portion of a cargo deck when the pivoting panel is in a deployed position, and a seat side having a full-sized seat cushion coupled thereto to provide a full-sized rear facing seat when the pivoting panel is in a stowed position.

2. The assembly of claim 1, wherein the pivoting panel is transitionally pivotal from the deployed position to the stowed position wherein the cargo deck side rests on a first deck portion of the main body.

3. The assembly of claim 2, wherein the pivoting panel is transitionally pivotal from the stowed position to the deployed position wherein the cargo deck side of the pivoting panel is substantially coplanar with the first deck portion to form a substantially flat cargo deck.

4. The assembly of claim 1, wherein the main body comprises a single molded structure having the hip restraints integrally molded therewith and passenger hand holds integrally formed within the integrally molded hip restraints.

5. The assembly of claim 1, wherein the assembly further comprises at least one seat back cushion having at least one threaded cinch nut molded therein, the cinch nut adapted to couple the seat back cushion to an integrally formed back side of the main body by inserting a bolt through an aperture in the back side and threading the bolt into the threaded cinch nut.

6. A method for providing a rear facing seat on a utility vehicle, said method comprising:
 coupling a molded main body structure to a mounting bracket connected to a frame of the utility vehicle and to a metal undercarriage structure coupled to the frame of the utility vehicle;
 rotationally transitioning a pivoting panel from a deployed position, wherein a cargo deck side of the pivoting panel provides a portion of a cargo deck, to a stowed position, wherein a seat side of the pivoting panel having a full-sized seat cushion coupled thereto provides a full-sized rear facing seat.

7. The method of claim 6, wherein rotationally transitioning the pivoting panel from the deployed position comprises resting the cargo deck side of the pivoting panel on a first deck portion of the main body such that a first portion of the pivoting panel is supported by the first deck portion and a second portion of the pivoting panel overhangs the first deck portion and is supported by hinge posts of the pivoting panel extending into elongated receptacles formed in a pair of hip restraints integrally formed in the main body, thereby allowing the pivoting panel to be sized to support the full-sized seat cushion and provide the full-sized rear facing seat.

8. The method of claim 6, wherein the method further comprises mating a first connector of at least one seat back cushion with a second connector included in a back side of the main body extending substantially perpendicular from the first deck portion such that the seat back cushion is removeably coupled to the back side.

9. A light-weight utility vehicle comprising:
 a convertible cargo bed assembly, said convertible cargo bed assembly comprising:
  a single molded main body structure including a pair of integrally formed hip restraints that each include a passenger hand hold integrally formed within the respective hip restraint;
  a molded foot rest structure coupled to a metal under carriage; and
  a pivoting panel including a cargo deck side adapted to provide a portion of a cargo deck when the pivoting panel is in a deployed position and a seat side having a full-sized seat cushion coupled thereto to provide a full-sized rear facing seat when the pivoting panel is in a stowed position.

* * * * *